G. M. NEAGLEY.
GAS WELDING TORCH.
APPLICATION FILED AUG. 17, 1915.
1,194,769.
Patented Aug. 15, 1916.
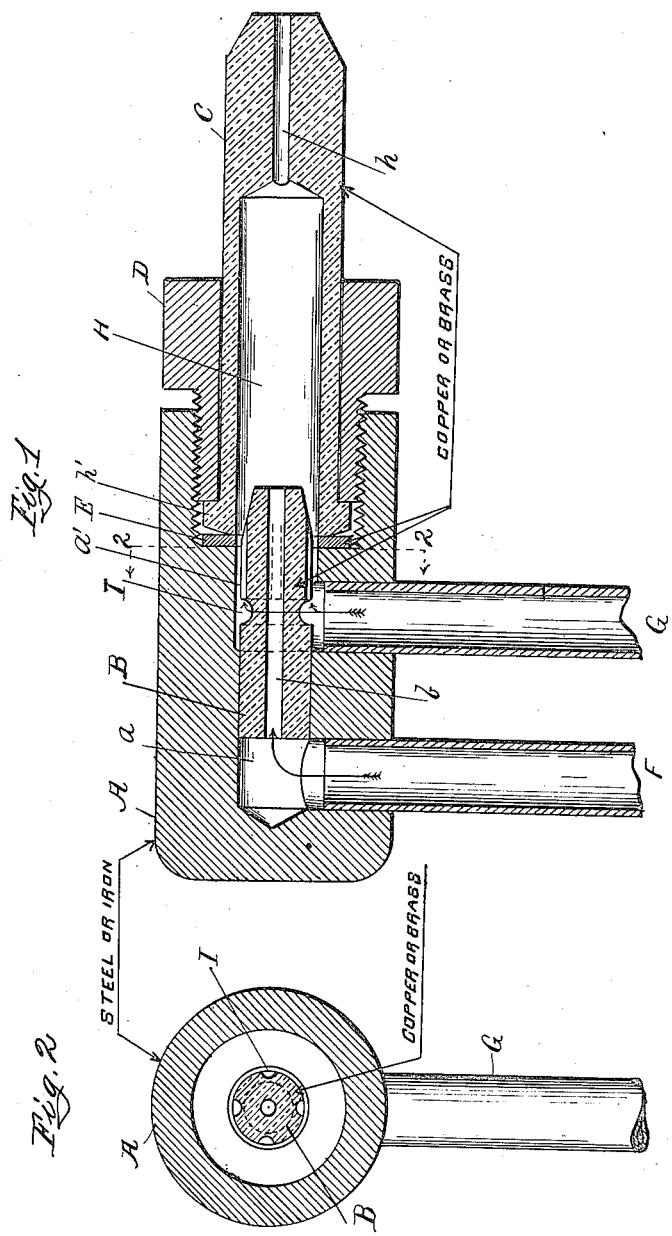

UNITED STATES PATENT OFFICE.

GUY MITCHELL NEAGLEY, OF CARRICK, PENNSYLVANIA.

GAS WELDING-TORCH.

1,194,769.   Specification of Letters Patent.   Patented Aug. 15, 1916.

Substitute for application Serial No. 830,693, filed April 9, 1914. This application filed August 17, 1915.
Serial No. 45,862.

*To all whom it may concern:*

Be it known that I, GUY MITCHELL NEAGLEY, a citizen of the United States, residing at Carrick, in the county of Allegheny and State of Pennsylvania, have invented certain new and useful Improvements in Gas Welding-Torches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in gas welding torches; and the objects of my invention are, first, to provide gas welding torches that are more simple in construction and design, the construction providing an absolutely gas-tight joint in the mixing chamber; second, the injector tube and mixing chamber are primarily in the head, the inside of the welding tip forming an expansion chamber wherein the gases are more homogeneously mixed before leaving the welding tip, thereby producing more nearly perfect combustion, high efficiency and better economy of gases. I attain these objects by the mechanism illustrated in the accompanying drawings, in which—

Figure 1 is a longitudinal sectional view of the gas torch welding head assembly; Fig. 2, a cross section taken at the line 2 2. Similar letters refer to similar parts throughout the several views.

To put my invention into practice, I first provide a body-portion or head A, preferably cylindrical in form and made of steel, having at its forward end an internal threaded socket, a central longitudinal bore of varying diameters, that $a'$, at the forward end being greater than the diameter $a$, at the rear; the body-portion fitted with two inlet tubes F G, communicating with the chambers $a$ $a'$.

Concentrically with, neatly fitting and supported in the chamber $a$, and projecting through and beyond the chamber $a'$, is an injector tube, which comprises a cylindrical member B having a central bore $b$, a tapering nozzle and an annular groove communicating with a mixing chamber H, by means of longitudinally arranged ducts I, formed in the body of said injector tube. The welding tip C, comprises an annular body provided with an internal mixing chamber H, into which the injector tube B, projects a short distance. A small duct $h$, leads forward from the mixing chamber H, to the welding tip proper, and has an annular flange $h'$, at the rear; the external rear surface is slightly convex the better to contact with a soft metal washer E, intermediate of the head A, and said welding tip C. A union nut D, is now provided which engages with the threaded socket formed in the head A, and when screwed in place serves to hold the parts of the torch rigidly together. The metal washer E, I prefer made of soft copper, but this washer may be made of brass or other suitable metal, having a greater co-efficient of expansion than the head A, and at the same time resist a high temperature. This is also true with reference to the injector tube B, which I prefer to make of copper, brass or bronze, which metal having a greater expansion than the head A, when subjected to varying temperatures, will be more rigidly confined in its position and thereby effectually separate the two gases before their entrance into the mixing chamber H.

The peculiar construction and manner of connecting the welding tip C, with the head A, and the intermediate soft metal washer E, with its greater co-efficient of expansion will form an absolute gas-tight joint, as is obvious.

It will be noticed that the welding tip is formed without internal or external screw threads. This is a decided advantage, as the continuous or intermittent use of the tool will cause enlargement of such threads, loosening the connection thereby causing leakage of the gases.

Another advantage in this construction of a gas welding torch is in having a large mixing and expansion chamber in the welding tip, as the gases when mixed will be in close proximity to the exit of the welding tip proper.

I am aware that prior to my invention gas welding torches have been made of various constructions and designs, and I have found all makes of gas welding torches, coming within my observation and personal use, to leak after several months' usage and frequent and costly replacements necessary.

Having thus described my invention, I claim:—

The combination with a gas torch welding head, a welding tip connected thereto, a mixing chamber formed in said tip, a duct leading from said chamber to the point of said tip, and an intermediate concentric injector tube pressed into said head and positioned to separate the one gas inlet from the other, said tube being made of a metal having a greater co-efficient of expansion than that of the welding head, thereby effectually separating the gases before their mixing and combustion.

In testimony whereof, I affix my signature, in presence of two witnesses.

GUY MITCHELL NEAGLEY.

Witnesses:
    M. E. HARRISON,
    IDA A. STURTEVANT.